United States Patent [19]
Plamthottam et al.

[11] Patent Number: 5,618,883
[45] Date of Patent: Apr. 8, 1997

[54] STYRENE ETHYLENE-BUTYLENE AND ETHYLENE-PROPYLENE BLOCK COPOLYMER HOT MELT PRESSURE SENSITIVE ADHESIVES

[75] Inventors: Sebastian S. Plamthottam; Ramon Roman, both of Upland; John Landers, Duarte; Roger H. Mann, Corona Del Mar; Karl Josephy, Los Angeles; Ronald Ugolick, San Dimas, all of Calif.

[73] Assignee: Avery Dennison Corporation, Pasadena, Calif.

[21] Appl. No.: 478,102

[22] Filed: Jun. 7, 1995

[51] Int. Cl.⁶ .......................... C08L 53/02; C08L 51/04; C08L 93/04
[52] U.S. Cl. .................. 525/98; 524/271; 524/274; 524/505; 524/499; 525/71; 525/97; 525/99
[58] Field of Search ...................... 524/271, 274, 524/505, 499; 525/71, 88, 97, 98, 99

[56] References Cited

U.S. PATENT DOCUMENTS

| | | | |
|---|---|---|---|
| 3,514,417 | 5/1970 | Bickel et al. | 524/274 |
| 3,862,068 | 1/1975 | Russell | 524/271 |
| 5,216,074 | 1/1993 | Imai et al. | 525/98 |
| 5,274,037 | 12/1993 | Miller | 524/271 |
| 5,286,781 | 2/1994 | Gotoh et al. | 524/271 |
| 5,459,193 | 10/1995 | Anderson et al. | 525/98 |
| 5,500,293 | 3/1996 | Lau et al. | 524/274 |

*Primary Examiner*—Peter A. Szekely
*Attorney, Agent, or Firm*—Christie, Parker & Hale, LLP

[57] ABSTRACT

A hot melt pressure sensitive adhesive composition comprising a tackified ethylene-propylene rubber modified with a copolymer of a styrene ethylene-propylene block copolymer and/or a styrene ethylene-butylene block is provided. The pressure sensitive adhesive exhibits high cohesive strength and adhesion to polar and apolar surfaces.

19 Claims, No Drawings

STYRENE ETHYLENE-BUTYLENE AND ETHYLENE-PROPYLENE BLOCK COPOLYMER HOT MELT PRESSURE SENSITIVE ADHESIVES

FIELD OF THE INVENTION

The invention relates to rubber based hot melt pressure sensitive adhesives utilizing ethylene-propylene and ethylene-butylene block copolymers as modifiers for tackified ethylene-propylene rubbers.

BACKGROUND OF THE INVENTION

The present invention is directed to multicomponent pressure sensitive adhesives based on the use of block copolymers containing ethylene-olefin blocks and particularly the equivalent of a saturated ethylene-butylene or ethylene-propylene blocks copolymerized with polystyrene endblocks as modifiers for tackified ethylene-propylene rubbers.

Ethylene-propylene rubbers have been known in the art to provide curable pressure sensitive adhesive compositions which can be cast out of solvent. Their acceptance in the art, however, has been limited as there exists quite stable acrylic based copolymers with saturated or unsaturated backbones which also provide excellent elevated temperature properties. Acrylic based pressure sensitive adhesives, usually require the use of a solvent or water as the carrier, where the adhesive polymer is emulsifiable, to enable proper casting onto a substrate. This requires the use of a solvent recovery system or means to eliminate water as the carrier.

A more desirable method of casting an adhesive is from a hot melt. In this method of application, a pressure sensitive adhesive composition is applied to a substrate such as paper or Mylar™, solvent and carrier free, by melting and coating the adhesive composition at some temperature below a degradation temperature at which it will flow and which when cooled to a use temperature, normally ambient, will solidify to a tacky end product.

Pressure sensitive adhesives have been formulated using natural rubber, linear and multi-armed block copolymers comprising isoprene or butadiene such as polyisoprene, styrene-butadiene (SB) and styrene-butadiene-styrene (SBS), and mixtures thereof, styrene-isoprene (SI) and styrene-isoprene-styrene (SIS) block copolymers and mixtures thereof and the like.

While SIS and SBS block copolymers are widely used, they show inferior aging characteristics due to the presence of high levels of unsaturation in the backbone.

Hydrogenated block copolymer such as styrene ethylene-butylene (SEBS) based pressure sensitive adhesives exhibit excellent adhesion compared to acrylics, and excellent aging compared to styrene-isoprene and styrene-butadiene block copolymer based adhesives. However, the high temperature performance of such adhesives has been poor compared to solvent based acrylic adhesives.

U.S. Pat. No. 4,152,231 discloses that high temperature performance of styrene-isoprene and styrene butylene based adhesives could be enhanced using radiation cure in presence of multifunctional acrylates while U.S. Pat. No. 4,820,746 discloses means to improve high temperature performance while maintaining high peel adhesion.

U.S. Pat. No. 4,578,429 describes a thermally stable, modified, selectively hydrogenated, 1,2 diene block copolymer, wherein a maleic anhydride functional group is grafted on to the polymer backbone. The product is described as useful in providing an interaction not possible with pure hydrocarbon polymers, and in binding proteins such as heparin for blood compatibility.

European Patent Publication 1 780 62 discloses a pressure sensitive adhesive based on ethylene-propylene thermoplastic elastomer comprising crystalline polypropylene sequences and amorphous ethylene-propylene sequences along the chain. Such polymers are claimed to have good balance of peel, shear and tack properties.

European Patent Publication 2 540 02 disclosed a pressure sensitive adhesive with enhanced tack comprising an elastomer, tackifier and low molecular weight ethylene-propylene copolymer obtained by oxidative degradation.

U.S. Pat. No. 4,756,337 discloses a tackified ethylene-propylene based pressure sensitive adhesive tape for sealing gas pipe lines.

Ethylene-propylene rubber (EPR) based pressure sensitive adhesives are known although not widely used in the adhesives industry. Such adhesives have normally only been shown to have excellent adhesion characteristics when crosslinked by radiation or chemical crosslinking. When uncrosslinked, EPR based adhesives showed inferior room temperature shear properties compared to their cured counterparts.

This invention pertains to improving the shear adhesion properties of tackified EPR polymers by incorporating modifying ethylene-propylene and ethylene-butylene block copolymers.

SUMMARY OF THE INVENTION

The present invention provides pressure sensitive adhesives which are based on tackified mixtures of an ethylene-propylene rubber modified with styrene ethylene-butylene, styrene ethylene-propylene block copolymers or mixtures thereof. The blends are physical blends having a melt viscosity sufficiently low to enable casting onto a substrate as a hot melt which when cooled remains tacky and at the same time provides excellent shear adhesion and adhesion to both polar and apolar surfaces such as stainless steel and olefin polymers.

The ethylene-propylene rubbers which may be employed in the invention include ethylene propylene rubbers polymerized as such and other polymers such as maleated ethylene propylene rubber and ethylene propylene diene monomer terpolymers (EPDM).

The styrene ethylene-propylene and styrene ethylene-butylene modifiers are block copolymers having an ethylene-butylene or ethylene-propylene midblock and endblocks of polystyrene or a block comprising at least one monoalkenyl arene such as alpha methyl styrene, vinyl toluene and the like.

In the pressure sensitive adhesive compositions, the styrene ethylene-propylene and/or styrene ethylene-butylene block copolymers can be present in an amount of from 5 to about 50% by weight, preferably from about 10 to about 20% by weight of the composition. Compatible tackifiers, normally a blend of tackifiers, may be present in an amount of from about 50 to about 80% by weight, preferably about 55 to about 75% by weight of the composition with the ethylene-propylene rubber occupying the balance of the essential components forming the pressure sensitive adhesive composition.

The compositions of the invention display physical as opposed to chemical crosslinks and, in consequence, show excellent cohesive properties and high room temperature adhesion to polar and apolar surfaces plus the ability to be cast as a hot melt. What is significant is the characteristic of displaying adhesion to low energy apolar surfaces such as polypropylene which approaches or even exceeds adhesion to polar substrates such as stainless steel without further modification of the composition.

DETAILED DESCRIPTION

The present invention is directed to ethylene-propylene rubber based pressure sensitive adhesives formed of tackified ethylene-propylene rubber modified by the addition of a styrene ethylene-propylene and/or styrene ethylene-butylene block copolymer modifiers. The compositions provide excellent adhesion to low and high energy surfaces and as physical blend can be cast as a hot melt.

In the present invention, the ethylene-propylene rubber polymers (EPR) may be saturated or contain functional moieties which may or may not be reactive. The ethylene-propylene rubbers include ethylene propylene copolymers including random copolymers, maleated ethylene-propylene copolymers, and terpolymers of ethylene and propylene with nonconjugated dienes such as 5-ethylidene-2-norbornene, 1,8 octadiene, 1,4 hexadiene cyclopentadiene (EPDM) and the like. The polymers may provide olefinic unsaturation in consequence of polymerzable dienes in the formation of ethylene-propylene of an available anhydride group such as maleated ethylene-propylene terpolymers. Maleated ethylene-propylene conjugated diene copolymers are available from Exxon Chemical Company under the Exxelor trade name. By the term "maleated" there is meant a cyclic anhydride group provided by the polymers. There may also be employed ethylene-propylene copolymers sold under the Vistalon trade name by Exxon Chemical Company which may be saturated or unsaturated.

The ethylene-propylene and ethylene-butylene copolymer modifiers employed in the invention are block copolymers with polystyrene endblocks. The endblocks may also comprise other monoalkenyl arene such as alpha methyl styrene, vinyl toluene and the like. The presently preferred styrene ethylene-propylene block copolymer (SEPS) is Kraton RP-6906 manufactured by Shell Chemical Company and the presently preferred styrene ethylene-butylene block copolymer (SEPS) is the Kraton G-1657 copolymer manufactured by Shell Chemical Company. Other copolymers may also be employed where the ethylene-propylene and ethylene-butylene groups serve as the midblock of the block copolymer.

Although any compatible tackifier may be used, the preferred tackifiers are substantially hydrogenated. By the term "substantially hydrogenated" there is meant that if the additive is aromatic, it should effectively be at least 50%, preferably at least 60%, saturated and if aliphatic, at least 65%, preferably 80%, of unsaturated groups in the organic additive as provided should be saturated or otherwise rendered nonresponsive to the action of free radicals. Complete or substantial hydrogenation is preferred, or at least saturation by hydrogenation, to a level where inclusion of the tackifier will prevent an adverse increase in melt viscosity for hot melt adhesive application.

As specific hydrogenated tackifiers employed in the practice of the invention, there may be mentioned hydrogenated styrene based resins such as Regalrez™ resins designated as 1018, 1033, 1065, 1078, 1094 and 1126 manufactured and sold by Hercules, inc.; Regalrez™ 6108, a 60% hydrogenated aromatic resin, also manufactured by Hercules; hydrogenated $C_5$ and/or $C_9$ hydrocarbon feed stocks such as Arkon™ P-70, P-90, P-100, P-125, P-115, M-90, M-100, M-110 and M-120 resins manufactured and sold by Arakawa Chemical and Regalite™ R-100, MGB-63, MGB-67, MGB-70, resins manufactured and sold by Hercules, Inc.; hydrogenated polycyclo-pentadienes such as Escorez™ 5320, 5300 and 5380 resins manufactured and sold by Exxon Chemical, hydrogenated polyterpene and other naturally occurring resins such as Clearon™ P-105, P-115, P-125, M-105, and M-115 manufactured and sold by Yasuhara Yushi Kogyo Co. Ltd. of Japan and Eastotack™ H-100, H-115 and H-130 resins manufactured and sold by Eastman Chemical and the like. It is presently preferred to employ a mixture of normally solid and liquid tackifiers to provide a composition having a suitable glass transition temperature.

Organic additives which serve a tackifying function are normally present in a concentration ranging from about 50 to about 80% by weight, preferably from about 55 to about 75% by weight of the composition, with the styrene ethylene-propylene and/or styrene ethylene-butylene block copolymers being present in an amount of from about 5 to about 50% by weight, preferably from about 10 to about 20% by weight of the composition.

As examples of other useful organic additives there may be mentioned compatible hydrogenated organic compounds, such as hydrogenated aromatic resins including hydrogenated polystyrene, polyalpha-methyl-styrene, polyvinyl toluene, copolymers of styrene with other monomers and the like; hydrogenated aliphatic resins derived from petroleum based products; highly hydrogenated rosins and rosin esters; hydrogenated white oil, mineral oil such as Kaydol oil made by Witco and the like.

The compositions of the instant invention may be and normally are made up of components having multiple glass transition temperatures. To be functional as a pressure sensitive adhesive the composition must have at least one major glass transition temperature which is at least about 10° C. below use temperatures, preferably at least 20° C. below use temperatures.

The presently preferred compositions are hot melt coated at a coat weight of about 25 g/m² or more and provide in respect of a polar surface, such as a stainless steel substrate, a 180° peel in excess of about 600 N/m and at the same time a peel to an apolar surface such as to polypropylene of equal magnitude, e.g., in excess of about 600 N/m. In addition, the compositions provide excellent ambient (room temperature) and elevated temperature (SAFT) shear properties. This is a most unique balance of properties for an adhesive composition and quite unique for one which relies on physical and not chemical crosslinks to thereby enable hot melt application.

There may be incorporated in the compositions of this invention other property modifiers such as fillers, short fibers, pigments, and the like.

As indicated, pressure sensitive adhesives of the instant invention exhibit superior adhesive properties, in particular unusually high adhesion to low energy, apolar surfaces such as polypropylene automotive paints and the like, and high energy polar surfaces such as stainless steel. They resist oxidative changes and are ideally suited as skin adhesives for conforming tapes, and for masking tapes where the adhesive is to come in contact with painted and metal surfaces.

Without limiting the following examples and controls illustrate the invention. In the Examples and Controls, peel was measured according to Pressure Sensitive Tape Council (PSTC) Test Method No. 1, shear according to PSTC-7 and viscosity according to ASTM-1084. Loop tack was determined by forming an 8" loop of a 1" wide sample, mounting the loop in the jaws of an Instron tester and moving the loop against a test surface at 12" per minute and after a 1"×1" area was covered, removing the loop at 12" per minute. The force recorded was reported as loop tack. Shear adhesive force and temperature (SAFT) was determined as described in U.S. Pat. No. 5,244,962 to Plamthottam et al., incorporated herein by reference.

EXAMPLE 1 AND CONTROL 1

An adhesive formulation was screened for hot melt use by making a solution of Exxelor VA-1803, an ethylene-propylene rubber manufactured by Exxon, Regalrez 1094 and Regalrez 1018 in a 90/10 toluene/isopropyl alcohol solution by mixing 112.5 g of VA-1803 solution containing 11.2 g of VA-1803, 43.4 g of Regalrez 1018 toluene solution containing 26.3 g of resin and 20 g of Regalrez 1094 solution containing 13.4 of Regalrez 1094. Five grams of a styrene ethylene-propylene styrene block copolymer (WRC 90-095) from Shell was added to 80 g of the mixture to give a clear solution. The solution was coated on to a release paper and dried at 70° C. for 15 minutes in a forced air circulating oven. Coat weight was about 50 g/m². The adhesive was tested for 180° peel on stainless steel and on polypropylene and room temperature shear and shear adhesion failure temperature (SAFT) using a 1000 g weight. The control sample without the added SEPS was also prepared but gave very low room temperature shear adhesion and poor cohesive strength. The results indicated that the addition of SEPS substantially improves shear adhesion and cohesion of the tackified of EPR adhesive.

EXAMPLES 2, 3, AND 4 AND CONTROL 2

An ethylene-propylene rubber (EPR) hot melt adhesive was prepared by mixing a master batch of 20% by weight Exxelor VA-1803, tackified with 26.3% by weight Regalrez 1094, and 52.7% by weight Regalrez 1018. The components were blended in a Z-Blade mixer at 160°–170° C. until completely mixed. The master batch was divided into four parts. There was added 108 by weight of the 1st part of Kraton RP-6906, an ethylene-propylene copolymer (SEPS), to the 1st part (Example 2), 158 by weight of the 2nd part to the 2nd part (Example 3) and 208 by weight of the 3rd part to the 3rd part (Example 4). Example 2 had a 180° peel on stainless steel of 891 N/m, loop tack of 1808 N/m, and room temperature shear of 24+ hours when tested after hot melt coating onto Mylar at a 77 g/m² coat weight. Example 3 had a 180° peel of 809 N/m, a loop tack of 762 N/m, and room temperature shear of 24+ hours at a 51.2 g/m² coat weight. Example 4 had 140° peel of 1014 N/m, loop tack of 1406 N/m and room temperature shear of 25+ hours at 115 g/m² coat weight. The control, that portion without SEPS added could not be coated using conventional hot melt coating equipment due to an excessively high melt viscosity.

EXAMPLES 5 TO 14

Examples 5 to 14 of Table I show the relative adhesive properties of a styrene ethylene-butylene block copolymer as a modifier for maleated and saturated ethylene-propylene rubbers. The ethylene-propylene rubbers employed were Exxelor (VA-1803), a maleated EP rubber, and Vistalon 707 and Vistalon 88-1, both saturated ethylene-propylene rubbers, each manufactured and sold by Exxon. In each instance there was added to the rubber a styrene ethylene-butylene styrene block copolymer known as Kraton K-1657 manufactured by Shell. As tackifier there was employed Regalrez 1094 and Regalrez 1018, both manufactured by Hercules Co. Each blend was mixed at 177° C. under a nitrogen blanket and hot melt coated using a number 4 spacer. Adhesive properties determined using a 2 mil Mylar face stock were 180° peel adhesion to stainless steel (SS) and polypropylene (PP) after 20 minute dwell, loop tack to stainless steel, room temperature (RT) shear for ½" by ½" sample, and viscosity at 175° C.

Also shown in Table I is a comparison of a styrene ethylene-propylene (SEPS) (Examples 8–10) to styrene ethylene-butylene (SEBS) (Examples 11–13) as block copolymer modifier additives for Vistalon 2504, an ethylene-propylene rubber in which the diene is a nonconjugated diene.

Example 14 of Table I compares to Example 1 to show optimum compositions for a maleated EPR (Example 1) and a saturated EPR (Example 14), each using a styrene ethylene-butylene block copolymer as the modifier block copolymer.

TABLE I

| | Example | | | | | | | | | |
|---|---|---|---|---|---|---|---|---|---|---|
| | 5 | 6 | 7 | 8 | 9 | 10 | 11 | 12 | 13 | 14 |
| Component, % wt. | | | | | | | | | | |
| EPR VA-1803 | 15.3 | | | | | | | | | |
| EPR V-707 | | 15.3 | | | | | | | | |
| EPR V-81-1 | | | 15.3 | | | | | | | |
| EPR V-2504 | | | | 25 | 20 | 20 | 25 | 20 | 20 | 21.4 |
| SEPS Kraton RP-6906 | | | | 10 | 20 | 10 | | | | |
| SEBS Kraton G-1657 | 19.2 | 19.2 | 19.2 | | | | 10 | 20 | 10 | 10 |
| Tackifier, Regalrez 1094 | 40.0 | 40 | 40 | 25 | 10 | 30 | 25 | 10 | 30 | 30 |
| Tackifier, Regalrez 1018 | 25.5 | 25.5 | 25.5 | 40 | 50 | 40 | 40 | 50 | 40 | 38.6 |
| Property | | | | | | | | | | |
| 180° Peel, SS, N/m | 850 | 951 | 783 | 1017 | 728 | 945 | 607 | 770 | 616 | 724 |
| 180° Peel, PP, N/m | 815 | 961 | 824 | 1279 | 965 | 873 | 777 | 923 | 1142 | 894 |
| Loop Tack, SS, N/m | 783 | 633 | 534 | 762 | 492 | 423 | 389 | 623 | 383 | 711 |
| RT Shear, Min. | 268 | 516 | 364 | 95 | 29 | 107 | 791 | 98 | 215 | 165 |
| SAFT, °C. | 85 | 77 | 74 | | | | | | | |
| Viscosity @ 175° C., Pa · s | 85 | 104 | 78 | | | | | | | |
| Adhesive Coat Wgt., g/m² | 25 | 25 | 25 | 35 | 31 | 38 | 28 | 26 | 28 | 25 |

What is claimed is:

1. A pressure sensitive adhesive comprising a tackified ethylene-propylene rubber modified with a block copolymer modifier selected from the group consisting of styrene ethylene-propylene block copolymers, styrene ethylene-butylene block copolymers or mixtures thereof, said block copolymer modifier provided in an amount sufficient to cause the tackified ethylene-propylene rubber to be hot melt coatable, said pressure sensitive adhesive exhibiting high cohesive strength and adhesion to polar and apolar surfaces.

2. A pressure sensitive adhesive as claimed in claim 1 in which the ethylene-propylene rubber is selected from the group consisting of ethylene-propylene copolymers, maleated ethylene-propylene copolymers and terpolymers of ethylene and propylene with a nonconjugated diene.

3. A pressure sensitive adhesive as claimed in claim 1 in which the tackifier is a mixture of hydrogenated styrene based resins.

4. A pressure sensitive adhesive composition as claimed in claim 1 in which the tackifier is present in an amount of from about 50 to about 80 percent by weight of the composition.

5. A pressure sensitive adhesive composition as claimed in claim 1 in which the tackifier is present in an amount of from about 55 to about 75 percent by weight of the composition.

6. A pressure sensitive adhesive composition as claimed in claim 1 in which the block copolymer modifier is present in an amount of from about 5 to about 50 percent by weight of the composition.

7. A pressure sensitive adhesive composition as claimed in claim 1 in which the block copolymer modifier is present in an amount of from about 10 to about 20 percent by weight of the composition.

8. A pressure sensitive adhesive as claimed in claim 1 in which the composition has a 180° peel adhesion to stainless steel and to polypropylene of greater than about 600 N/m for a coat weight of about 25 g/m$^2$.

9. A pressure sensitive adhesive comprising a tackified, ethylene-propylene rubber modified from about 5 to about 50 percent by weight of the composition with a block copolymer modifier selected from the group consisting of styrene ethylene-propylene block copolymers, styrene ethylene-butylene block copolymers or mixtures thereof, said composition modified with from about 50 to about 80 percent by weight of the tackifier, the balance of the composition being an ethylene-propylene rubber, said pressure sensitive adhesive being hot melt coatable and exhibiting high cohesive strength and adhesion to polar and apolar surfaces.

10. A pressure sensitive adhesive as claimed in claim 9 in which the ethylene-propylene rubber is selected from the group consisting of ethylene-propylene copolymers, maleated ethylene-propylene copolymers and terpolymers of ethylene and propylene with a nonconjugated diene.

11. A pressure sensitive adhesive as claimed in claim 9 in which the tackifier is a mixture of hydrogenated styrene based resins.

12. A pressure sensitive adhesive as claimed in claim 10 in which the tackifier is a mixture of hydrogenated styrene based resins.

13. A pressure sensitive adhesive composition as claimed in claim 12 in which the tackifier is present in an amount of from about 55 to about 75 percent by weight of the composition.

14. A pressure sensitive adhesive composition as claimed in claim 9 in which the block copolymer modifier is present in an amount of from about 10 to about 20 percent by weight of the composition.

15. A pressure sensitive adhesive composition as claimed in claim 10 in which the block copolymer modifier is present in an amount of from about 10 to about 20 percent by weight of the composition.

16. A pressure sensitive adhesive composition as claimed in claim 11 in which the block copolymer modifier is present in an amount of from about 10 to about 20 percent by weight of the composition.

17. A pressure sensitive adhesive composition as claimed in claim 12 in which the block copolymer modifier is present in an amount of from about 10 to about 20 percent by weight of the composition.

18. A pressure sensitive adhesive composition as claimed in claim 13 in which the block copolymer modifier is present in an amount of from about 10 to about 20 percent by weight of the composition.

19. A pressure sensitive adhesive as claimed in claim 9 in which the composition has a 180° peel adhesion to stainless steel and to polypropylene of greater than about 600 N/m for a coat weight of about 25 g/m$^2$.

* * * * *

UNITED STATES PATENT AND TRADEMARK OFFICE
CERTIFICATE OF CORRECTION

PATENT NO. : 5,618,883
DATED : April 8, 1997
INVENTOR(S) : Sebastian S. Plamthottam; Ramon Roman; John Landers; Roger H. Mann; Karl Josephy; Ronald Ugolick It is certified that error appears in the above-indentified patent and that said Letters Patent is hereby corrected as shown below:

Column 3, line 66, change "Hercules, inc." to -- Hercules, Inc. --.
Column 5, line 42, replace "108" with -- 10% --.
Column 6, line 1, replace "158" with -- 15% --.
Column 6, line 2, replace "208" with -- 20% --.
Column 6, line 8, replace "140°" with -- 180° --

Signed and Sealed this

Sixteenth Day of June, 1998

Attest:

BRUCE LEHMAN

Attesting Officer

Commissioner of Patents and Trademarks